(12) United States Patent
Hashiba et al.

(10) Patent No.: US 9,337,709 B2
(45) Date of Patent: May 10, 2016

(54) AXIAL GAP TYPE PERMANENT MAGNET ELECTRIC ROTATING APPARATUS AND METHOD OF MANUFACTURING THE SAME

(71) Applicant: KABUSHIKI KAISHA TOSHIBA, Minato-ku (JP)

(72) Inventors: Yutaka Hashiba, Yokosuka (JP); Norio Takahashi, Yokohama (JP); Makoto Matsushita, Fuchu (JP); Masanori Arata, Yokohama (JP); Toshio Hirano, Yokohama (JP); Takaaki Hirose, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/324,587

(22) Filed: Jul. 7, 2014

(65) Prior Publication Data

US 2015/0015108 A1    Jan. 15, 2015

(30) Foreign Application Priority Data

Jul. 12, 2013    (JP) .................. 2013-146803

(51) Int. Cl.
*H02K 21/24* (2006.01)
*H02K 15/03* (2006.01)
*H02K 1/27* (2006.01)

(52) U.S. Cl.
CPC .................. *H02K 21/24* (2013.01); *H02K 1/27* (2013.01); *H02K 1/2793* (2013.01); *H02K 15/03* (2013.01); *H02K 1/2746* (2013.01); *Y10T 29/49012* (2015.01)

(58) Field of Classification Search
CPC .............................. H02K 21/24; H02K 16/02
USPC ............. 310/156.32, 156.34, 156.36, 156.37, 310/49.04, 49.05, 49.08, 49.096, 49.11, 310/49.22, 49.32, 154.05, 154.16, 154.37, 310/156.82
See application file for complete search history.

(56) References Cited

U.S. PATENT DOCUMENTS

| 5,945,766 A | * | 8/1999 | Kim et al. ..................... 310/268 |
| 6,605,883 B2 | * | 8/2003 | Isozaki et al. .............. 310/49.42 |

(Continued)

FOREIGN PATENT DOCUMENTS

| EP | 2 190 103 A1 | 5/2010 |
| JP | 2005-143276 A | 6/2005 |

(Continued)

OTHER PUBLICATIONS

Korean Office Action issued Nov. 13, 2015 in Patent Application No. 10-2014-0086523 (with English Translation).
Extended European Search Report mailed Jan. 25, 2016 in European Patent Application No. 14176269.0.

*Primary Examiner* — Naishadh Desai
(74) *Attorney, Agent, or Firm* — Oblon, McClelland, Maier & Neustadt, L.L.P

(57) ABSTRACT

According to one embodiment, there is provided an axial gap type permanent magnet electric rotating apparatus including a first and second rotor. All a magnetic-pole directions of a permanent magnets of the first and second rotor are the same. A portion between two permanent magnets along a circumferential direction of each rotor is made of a magnetic material having substantially the same size as that of the permanent magnet such that axial-direction surfaces are the same between the permanent magnets on two sides in the circumferential direction. Between the first rotor and the second rotor, a magnetic flux flows along an axial direction while making a loop and passes through an armature.

11 Claims, 12 Drawing Sheets

(56) References Cited

U.S. PATENT DOCUMENTS

| | | | |
|---|---|---|---|
| 6,717,324 B2 * | 4/2004 | Chen | 310/268 |
| 7,880,356 B2 * | 2/2011 | Takeuchi | 310/156.43 |
| 2003/0025417 A1 | 2/2003 | Rose | |
| 2003/0052553 A1 * | 3/2003 | Isozaki et al. | 310/49 R |
| 2004/0061397 A1 * | 4/2004 | Rose | 310/156.37 |
| 2004/0135453 A1 * | 7/2004 | Naito et al. | 310/156.32 |
| 2006/0028081 A1 * | 2/2006 | Minagawa | 310/156.36 |
| 2011/0298328 A1 * | 12/2011 | Okamoto | 310/198 |
| 2013/0038158 A1 | 2/2013 | Takahashi | |

FOREIGN PATENT DOCUMENTS

| | | |
|---|---|---|
| JP | 2005-151725 | 6/2005 |
| JP | 2005-237086 | 9/2005 |
| JP | 2011-078202 A | 4/2011 |
| KR | 10-2010-0031688 A | 3/2010 |
| KR | 10-2013-0038728 A | 4/2013 |

* cited by examiner

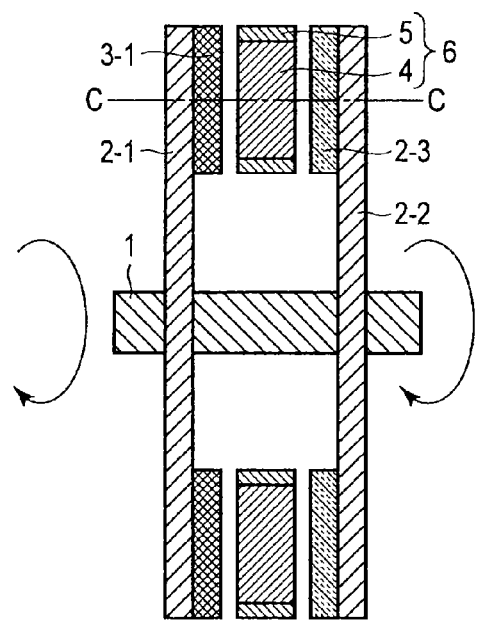
F I G. 12
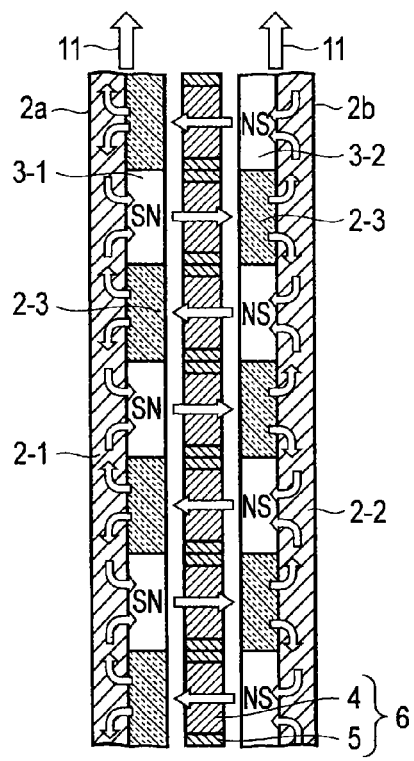
F I G. 13

AXIAL GAP TYPE PERMANENT MAGNET ELECTRIC ROTATING APPARATUS AND METHOD OF MANUFACTURING THE SAME

CROSS-REFERENCE TO RELATED APPLICATION

This application is based upon and claims the benefit of priority from Japanese Patent Application No. 2013-146803, filed Jul. 12, 2013, the entire contents of which are incorporated herein by reference.

FIELD

Embodiments described herein relate generally to an axial gap type permanent magnet electric rotating apparatus and a method of manufacturing the same.

BACKGROUND

A permanent magnet is generally used for a field system of an electric rotating apparatus from the viewpoint of a high efficiency. There is an axial gap type permanent magnet electric rotating apparatus in which a permanent magnet is arranged in a surface perpendicular to a shaft, an armature is arranged to oppose this permanent magnet, and an air gap is formed along the axial direction. A rotor of this electric rotating apparatus has an arrangement in which the permanent magnet is adhered to a rotor disk.

A plurality of rotors are arranged along the axial direction. The axial gap type permanent magnet electric rotating apparatus is configured such that armatures are arranged between the individual rotors, air gaps are formed between the rotors and armatures along the axial direction, and a magnetic flux passes from one rotor to another rotor on the opposite side through the armature.

When using this electric rotating apparatus as a generator, therefore, a magnetic flux generated from the permanent magnet by rotating the rotor by some power is passed, as a rotating magnetic field, through the armature. Thus, the armature can generate electric power.

As a related art, there is a double-rotor axial gap type permanent magnet electric rotating apparatus. This electric rotating apparatus has an arrangement in which permanent magnets embedded in back yokes of rotors are arranged in positions opposite to each other so as to sandwich an armature coil as a stator along the axial direction.

To obtain a high output when using a permanent magnet as a field system, it is necessary to use a high-performance magnet such as a neodymium magnet. Also, to make an electric rotating apparatus strong against demagnetization, it is necessary to use a neodymium magnet using a large amount of Dy (dysprosium). However, due to the scarcity of rare-earth materials, the cost of an electric rotating apparatus increases if a large amount of magnets are used.

Furthermore, the ratio of the processing cost of magnets is not low in the permanent magnet manufacturing cost. Therefore, the number of magnets has a large influence not only on the number of assembling steps as a whole but also on the magnet processing cost.

If, however, permanent magnets are arranged in a rotor so that different polarities are alternately arranged along the circumferential direction, permanent magnets equal in number to polarities are necessary, so the number of parts increases. In this case, it is necessary to use many permanent magnets requiring a complicated manufacturing process, high material cost, and high processing cost. This increases the overall cost of the electric rotating apparatus.

BRIEF DESCRIPTION OF THE DRAWINGS

FIG. 12 is an axial-direction sectional view of an axial gap type permanent magnet electric rotating apparatus according to the fourth embodiment;

FIG. 13 is a circumferential-direction developed view in a position C-C of FIG. 12;

DETAILED DESCRIPTION

In general, according to one embodiment, there is provided an axial gap type permanent magnet electric rotating apparatus including a first rotating disk and a second rotating disk having surfaces perpendicular to a rotation center of a shaft and containing a magnetic material, a first rotor to be rotated by a shaft and attached, along a circumferential direction, a plurality of permanent magnets whose magnetic-pole direction is an axial direction on an axial-direction surface of the first rotating disk, a second rotor to be rotated by the shaft and attached, along the circumferential direction, a plurality of permanent magnets whose magnetic-pole direction is the axial direction on an axial-direction surface of the second rotating disk, such that axial-direction surfaces of the permanent magnets oppose axial-direction surfaces of the permanent magnets of the first rotor, and an armature arranged between axial-direction opposing surfaces of the first rotor and the second rotor. All the magnetic-pole directions of the permanent magnets attached to the surface of the first rotor, which opposes the second rotor, are the same. All the magnetic-pole directions of the permanent magnets attached to the surface of the second rotor, which opposes the first rotor, are the same. A portion between two permanent magnets along the circumferential direction of each rotor is made of a magnetic material having substantially the same size as that of the permanent magnet such that axial-direction surfaces are the same between the permanent magnets on two sides in the circumferential direction. Between the first rotor and the second rotor, a magnetic flux flows along the axial direction while making a loop and passes through the armature.

Each embodiment will be explained below with reference to the accompanying drawings.

First, an axial gap type permanent magnet electric rotating apparatus according to a related art will be explained in order to facilitate an understanding of each embodiment.

Figure 15:
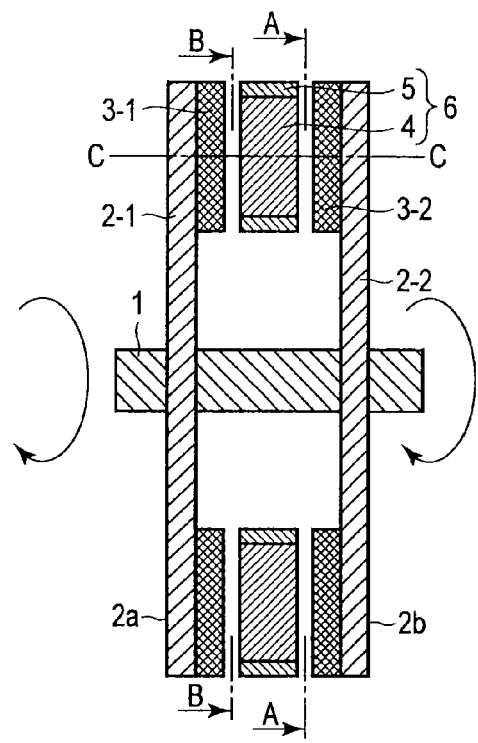
FIG. 15 is an axial-direction sectional view of the axial gap type permanent magnet electric rotating apparatus according to the related art.
Figure 16:
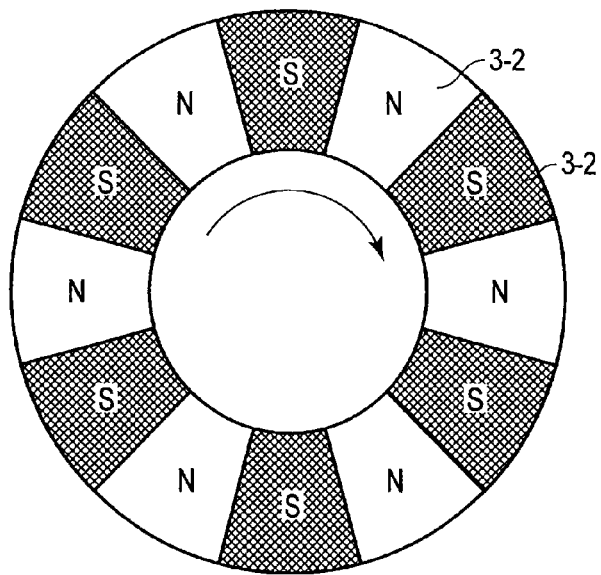
FIG. 16 is a view taken along an A-A plane of the axial gap type permanent magnet electric rotating apparatus according to the related art.
Figure 17:
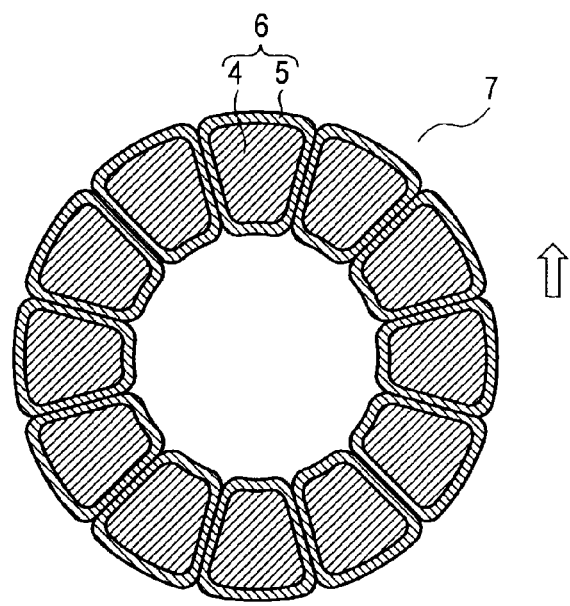
FIG. 17 is a view taken along a B-B plane of the axial gap type permanent magnet electric rotating apparatus according to the related art.
Figure 18:
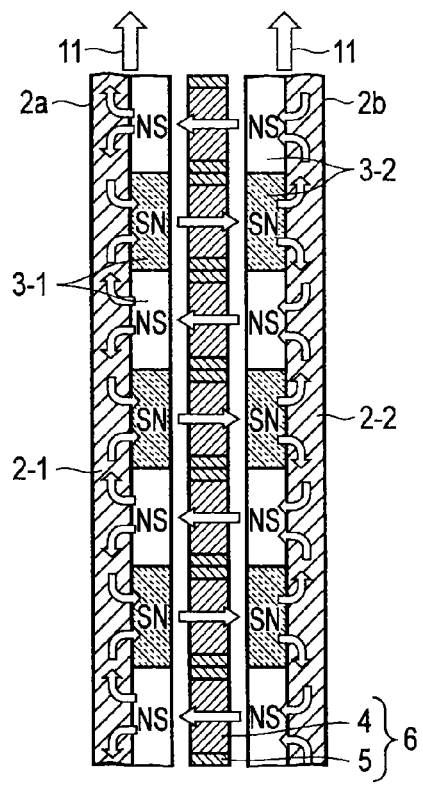
FIG. 18 is a circumferential-direction developed view from a position C-C of the axial gap type permanent magnet electric rotating apparatus according to the related art.

FIG. 15 is an axial-direction sectional view of the axial gap type permanent magnet electric rotating apparatus according to the related art. FIG. 16 is a view taken along an A-A plane of the axial gap type permanent magnet electric rotating apparatus according to the related art. FIG. 17 is a view taken along a B-B plane of the axial gap type permanent magnet electric rotating apparatus according to the related art. FIG. 18 is a circumferential-direction developed view from a position C-C of the axial gap type permanent magnet electric rotating apparatus according to the related art.

In FIGS. 15, 16, 17, and 18, the axial gap type permanent magnet electric rotating apparatus includes a shaft 1, a rotor 2, and permanent magnets 3. The shaft 1 is supported to be freely rotatable by bearings or the like. The rotor 2 includes rotating disks 2a and 2b having surfaces perpendicular to the rotation center of the shaft 1 and containing a magnetic material, and is fixed to the shaft 1. On the axial-direction surfaces of the rotating disks 2a and 2b forming the rotor 2, a plurality of permanent magnets 3 whose magnetic-pole direction is the axial direction are attached along the circumferential direction (rotational direction).

Also, grooves for attaching the permanent magnets 3 are formed in positions near the outer circumference of the rotor 2. The axial-direction surface of the rotor 2 is nearly flat when the permanent magnets 3 are attached to the grooves.

Furthermore, the rotor 2 includes first and second rotors 2-1 and 2-2 along the axial direction. These rotors are attached to the shaft 1 such that the axial-direction surfaces of the permanent magnets 3 oppose each other.

Permanent magnets attached to the first rotor 2-1 are called permanent magnets 3-1. Also, permanent magnets attached to the second rotor 2-2 are called permanent magnets 3-2.

All the magnetic-pole directions of the permanent magnets 3-1 attached to the surface of the first rotor 2-1, which opposes the second rotor 2-2 in the axial direction, are the same.

Likewise, all the magnetic-pole directions of the permanent magnets 3-2 attached to the surface of the second rotor 2-2, which opposes the first rotor 2-1 in the axial direction, are the same.

Furthermore, in positions along the circumferential direction on the opposing surfaces of the first and second rotors 2-1 and 2-2, the permanent magnets 3-1 and 3-2 are attached such that different polarities oppose each other.

Also, the N pole of the permanent magnet 3-1 on the first rotor 2-1 opposes the S pole of the permanent magnet 3-2 on the second rotor 2-2. The N pole of the permanent magnet 3-2 on the second rotor 2-2 opposes the S pole of the permanent magnet 3-1 on the first rotor 2-1.

On the first rotor 2-1, the permanent magnets 3-1 are arranged such that the polarities of the permanent magnets 3-1, which face the second rotor 2-2, are alternately arranged in the order of the N pole, S pole, and N pole along the circumferential direction. On the second rotor 2-2, the permanent magnets 3-2 are arranged such that the polarities of the permanent magnets 3-2, which face the first rotor 2-1, are alternately arranged in the order of the S pole, N pole, and S pole along the circumferential direction.

In addition, armatures 6 are formed between the axial-direction opposing surfaces of the first and second rotors 2-1 and 2-2. Each armature 6 includes an armature core 4 and armature coil 5. The armature coil 5 is wound around the armature core 4 so as to turn in the axial direction of the armature core 4.

Twelve armatures 6 are arranged along the circumferential direction, thereby forming a twelve-pole stator 7. The stator 7 is configured so as not to rotate. Each of the twelve armature coils 5 of the stator 7 is so connected as to have three phases.

Figure 19:
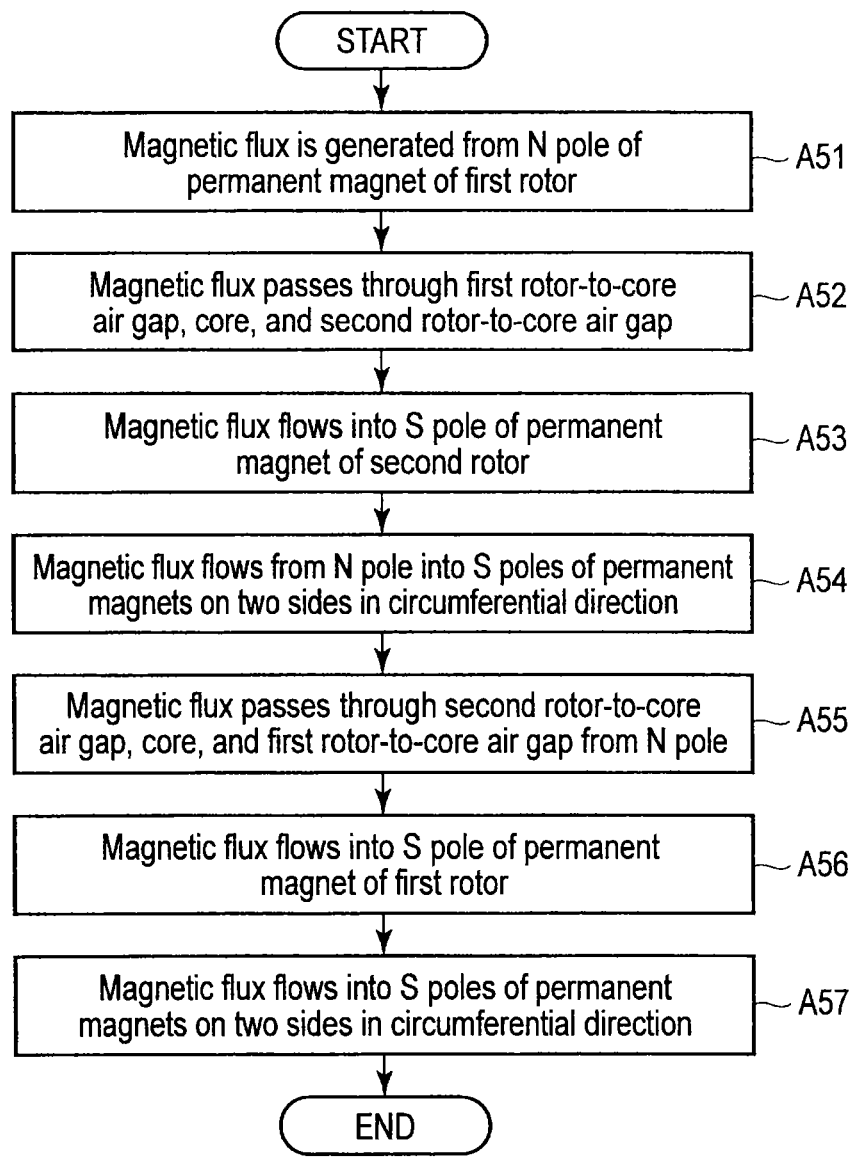
FIG. 19 is a flowchart for explaining the flow of a magnetic flux in the axial gap type permanent magnet electric rotating apparatus according to the related art.

Next, the function of the related art will be explained with reference to FIG. 19. FIG. 19 is a flowchart for explaining the flow of a magnetic flux in the axial gap type permanent magnet electric rotating apparatus according to the related art. As indicated by arrows in FIG. 18, when a magnetic flux is generated from the N pole of the permanent magnet 3-1 attached to the first rotor 2-1 (step A51), this magnetic flux passes through the air gap between the first rotor 2-1 and armature core 4 along the axial direction, and passes through the armature core 4. This magnetic flux further passes through the air gap between the armature core 4 and second rotor 2-2, and reaches the second rotor 2-2 (step A52).

The first and second rotors 2-1 and 2-2 are arranged such that the permanent magnets 3 having different polarities oppose each other in positions along the circumferential direction. Accordingly, the magnetic flux generated from the N pole of the permanent magnet 3-1 of the first rotor 2-1 flows into the S pole of the permanent magnet 3-2 of the second rotor 2-2 (step A53).

The magnetic flux having flowed into the S pole of the permanent magnet 3-2 of the second rotor 2-2 flows out from the N pole of the same permanent magnet 3-2, and flows into the S poles of the permanent magnets 3-2 on the two sides of the former permanent magnet 3-2 in the circumferential direction (step A54).

This magnetic flux flows out from the N pole of the permanent magnet 3-2 into which the magnetic flux has flowed, passes through the axial-direction air gap between the armature core 4 and second rotor 2-2, and passes through the armature core 4. This magnetic flux passes through the axial-direction air gap between the first rotor 2-1 and armature core 4, and reaches the first rotor 2-1 (step A55).

As described above, the first and second rotors 2-1 and 2-2 are arranged such that the permanent magnets 3 having different polarities oppose each other in positions along the circumferential direction. Accordingly, the magnetic flux generated from the N pole of the permanent magnet 3-2 of the second rotor 2-2 flows into the S pole of the permanent magnet 3-1 between two permanent magnets 3-1 of the first rotor 2-1 (step A56).

This magnetic flux flows into the S poles of the permanent magnets 3-1 on the two sides in the circumferential direction of the N pole of the permanent magnet 3-1 into which the magnetic flux has flowed (step A57).

As explained above, between the first and second rotors 2-1 and 2-2, a magnetic flux flows along the axial direction while making a loop, and always passes through the armature core 4.

The first and second rotors 2-1 and 2-2 are attached to the shaft 1 with relative positions in the circumferential direction being fixed. When the shaft 1 rotates, the first and second rotors 2-1 and 2-2 also rotate. Consequently, a magnetic flux flowing between the first and second rotors 2-1 and 2-2 passes, as a rotating magnetic field, through the armature core 4.

The armature coil 5 is wound around the axial-direction circumferential surface of the armature core 4. Accordingly, induced electric power is generated when a rotating magnetic field passes, and the axial gap type permanent magnet electric rotating apparatus functions as a generator.

Each embodiment will be explained below.

First Embodiment

The first embodiment will now be explained.

Figure 1:
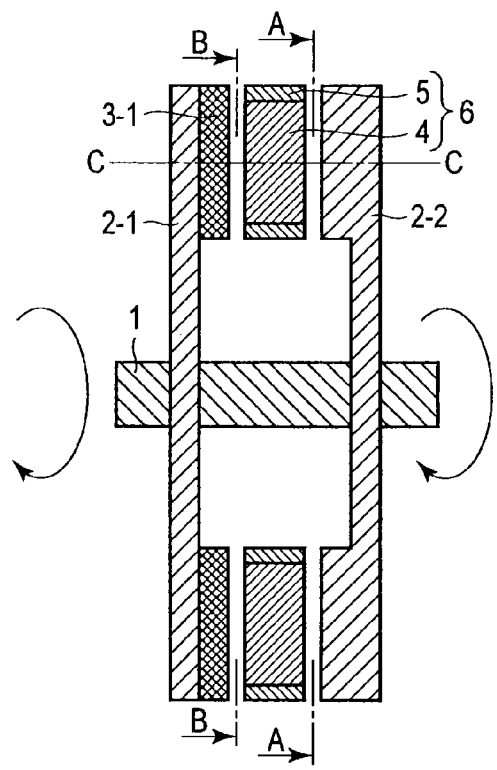
FIG. 1 is an axial-direction sectional view of an axial gap type permanent magnet electric rotating apparatus according to the first embodiment.
Figure 2:
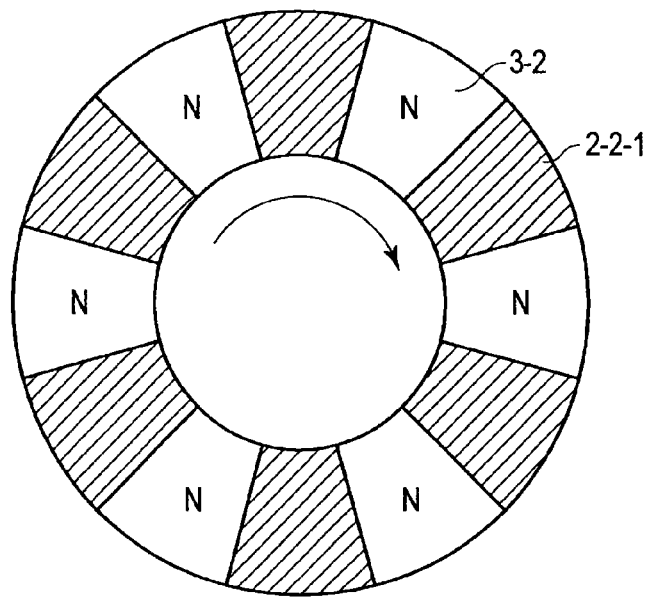
FIG. 2 is a view taken along an A-A plane of the axial gap type permanent magnet electric rotating apparatus according to the first embodiment.
Figure 3:
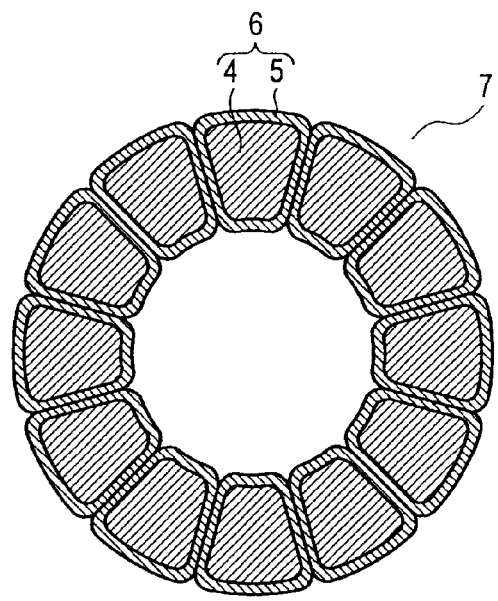
FIG. 3 is a view taken along a B-B plane of the axial gap type permanent magnet electric rotating apparatus according to the first embodiment.
Figure 4:
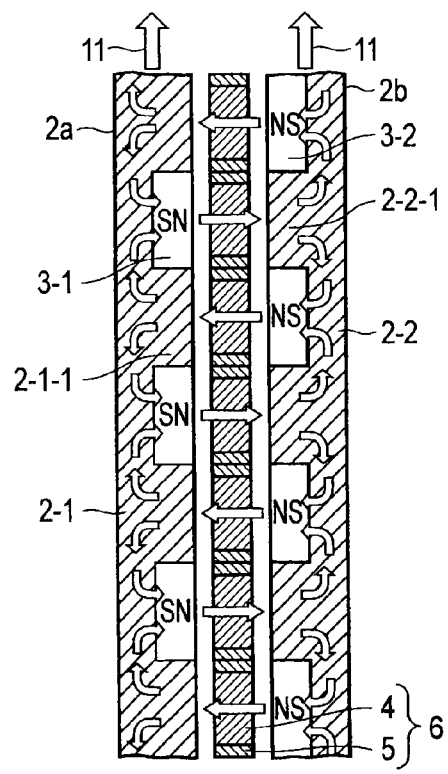
FIG. 4 is a circumferential-direction developed view from a position C-C of the axial gap type permanent magnet electric rotating apparatus according to the first embodiment.

The arrangement of the first embodiment will be explained with reference to FIGS. 1, 2, 3, and 4. FIG. 1 is an axial-direction sectional view of an axial gap type permanent magnet electric rotating apparatus according to the first embodiment. FIG. 2 is a view taken along an A-A plane of the axial gap type permanent magnet electric rotating apparatus according to the first embodiment. FIG. 3 is a view taken along a B-B plane of the axial gap type permanent magnet electric rotating apparatus according to the first embodiment. FIG. 4 is a circumferential-direction developed view from a position C-C of the axial gap type permanent magnet electric rotating apparatus according to the first embodiment.

Referring to FIGS. 1, 2, 3, and 4, the axial gap type permanent magnet electric rotating apparatus includes a shaft 1, a rotor 2, and permanent magnets 3. The shaft 1 is supported to be freely rotatable by bearings or the like. The rotor 2 includes rotating disks 2a and 2b having surfaces perpendicular to the rotation center of the shaft 1 and made of a magnetic material, and is fixed to the shaft 1.

Grooves having almost the same size as that of the permanent magnets 3 are formed in positions near the outer circumference of the rotor 2 in order to attach the permanent magnets 3. The rotor 2 is configured so that the axial-direction surface of the rotor 2 is nearly flat when the permanent magnets are attached to the grooves.

Consequently, in a first rotor 2-1 as shown in FIG. 4, a permanent magnet 3-1, a projection 2-1-1 of the rotating disk 2a, a permanent magnet 3-1, a projection 2-1-1, . . . , are arranged in this order on the axial-direction surface. Referring to FIG. 4, arrows 11 indicate the rotational directions of the first rotor 2-1 and a second rotor 2-2. In the second rotor 2-2 as shown in FIG. 4, a permanent magnet 3-2, a projection 2-2-1 of the rotating disk 2b, a permanent magnet 3-2, a projection 2-2-1, . . . , are arranged in this order on the axial-direction surface.

The rotor 2 includes the first and second rotors 2-1 and 2-2 along the axial direction. These rotors are attached to the shaft 1 such that the surfaces of the permanent magnets 3 oppose each other.

In positions along the circumferential direction of the opposing surfaces of the first and second rotors 2-1 and 2-2, the permanent magnets 3-1 and 3-2 are shifted from each other along a direction in which they do not oppose each other.

Armatures 6 are formed between the opposing surfaces along the axial direction between the first and second rotors 2-1 and 2-2. Each armature 6 includes an armature core 4 and armature coil 5. The armature coil 5 is wound around the armature core 4 so as to turn in the axial direction of the armature core 4.

Twelve armatures 6 are arranged along the circumferential direction, thereby forming a twelve-pole stator 7. The stator 7 is attached so as not to rotate. Each of the twelve armature coils 5 of the stator 7 is so connected as to have three phases.

Figure 5:
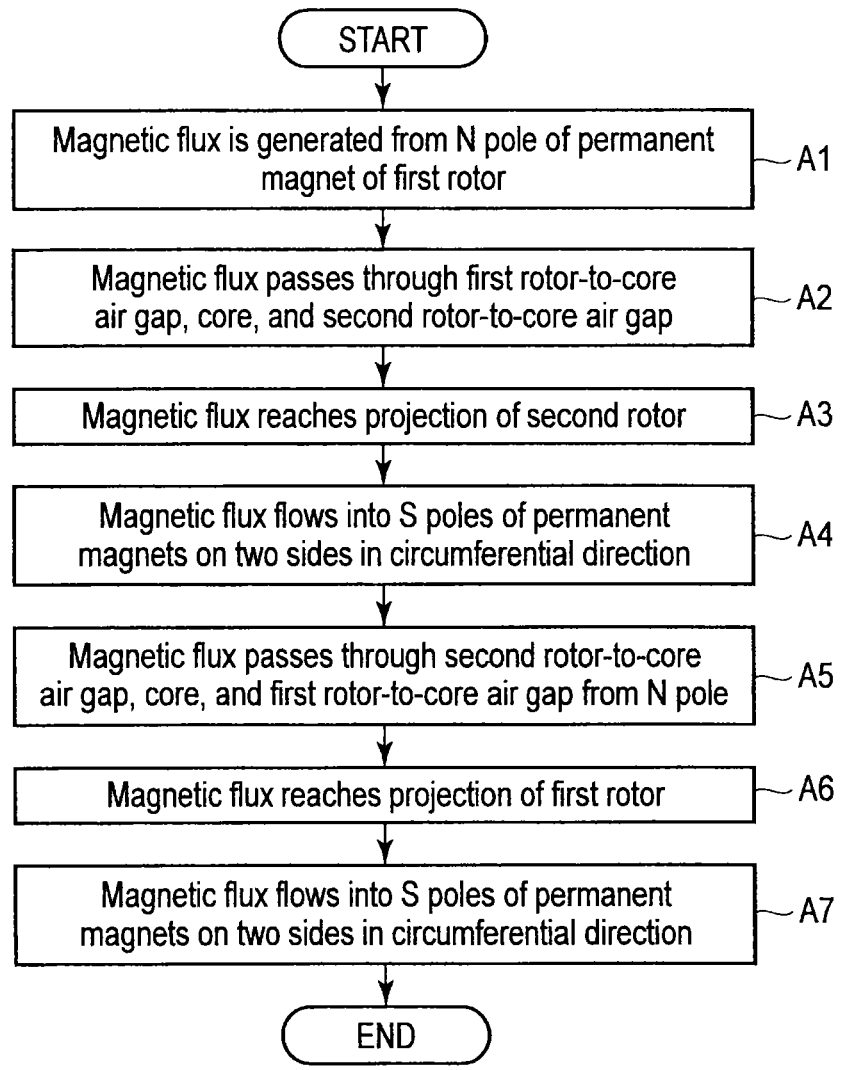
FIG. 5 is a flowchart for explaining the flow of a magnetic flux in the axial gap type permanent magnet electric rotating apparatus according to the first embodiment.

Next, the function of the first embodiment will be explained. FIG. 5 is a flowchart for explaining the flow of a magnetic flux in the axial gap type permanent magnet electric rotating apparatus according to the first embodiment.

As indicated by arrows in FIG. 4, when a magnetic flux is generated from the N pole of the permanent magnet 3-1 attached to the first rotor 2-1 (step A1), this magnetic flux passes through the air gap between the first rotor 2-1 and armature core 4 along the axial direction, and passes through the armature core 4. This magnetic flux further passes through the air gap between the armature core 4 and second rotor 2-2 along the axial direction, and reaches the second rotor 2-2 (step A2).

The first and second rotors 2-1 and 2-2 are arranged such that the permanent magnets 3 do not oppose each other in positions along the circumferential direction. Accordingly, the magnetic flux generated from the N pole of the permanent magnet 3-1 of the first rotor 2-1 reaches the projection 2-2-1 between two permanent magnets 3-2 of the second rotor 2-2 (step A3).

The magnetic flux having reached the projection 2-2-1 of the second rotor 2-2 flows into the S poles of the permanent magnets 3-2 positioned on the two sides of the projection 2-2-1 in the circumferential direction (step A4).

This magnetic flux flows out from the N pole of the permanent magnet 3-2 of the second rotor 2-2, further passes through the axial-direction air gap between the armature core 4 and second rotor 2-2, and passes through the armature core 4. This magnetic flux passes through the axial-direction air gap between the first rotor 2-1 and armature core 4, and reaches the first rotor 2-1 (step A5).

As described above, the first and second rotors 2-1 and 2-2 are arranged such that the permanent magnets 3 are shifted from each other along the circumferential direction in positions along the circumferential direction so as not to oppose each other. Accordingly, the magnetic flux generated from the permanent magnet 3-2 of the second rotor 2-2 reaches the projection 2-1-1 between two permanent magnets 3-1 of the first rotor 2-1 (step A6).

The magnetic flux having flowed into the projection 2-1-1 of the first rotor 2-1 flows into the S poles of the permanent magnets 3-1 on the two sides of the projection 2-1-1 in the circumferential direction (step A7).

As explained above, between the first and second rotors 2-1 and 2-2, a magnetic flux flows along the axial direction while making a loop, and always passes through the armature core 4.

The first and second rotors 2-1 and 2-2 are attached to the shaft 1 with relative positions in the circumferential direction being fixed. When the shaft 1 rotates, the first and second rotors 2-1 and 2-2 also rotate. Consequently, a magnetic flux flowing between the first and second rotors 2-1 and 2-2 passes, as a rotating magnetic field, through the armature core 4.

The armature coil 5 is wound around the axial-direction circumferential surface of the armature core 4. Induced electric power is generated when a rotating magnetic field passes through the armature core 4, and the axial gap type permanent magnet electric rotating apparatus functions as a generator.

As explained above, the projections 2-1-1 and permanent magnets 3-1 are alternately arranged along the circumferential direction in the first rotor 2-1, the projections 2-2-1 and permanent magnets 3-2 are alternately arranged along the circumferential direction in the second rotor 2-2, and the projections 2-1-1 and 2-2-1 of the two rotors also form magnetic poles. When configuring a twelve-pole electric rotating apparatus, therefore, a magnetic path can be formed by using, for each rotor, six permanent magnets, which is half the number of permanent magnets used in the related art.

Accordingly, the total number of magnets can be reduced to 12 which is the half of 24 of the related art. This makes it possible to reduce the use amount of expensive permanent magnets. In addition, since the number of parts to be assembled decreases, assembling is simplified, and the assembling cost can be reduced.

Assuming that the magnetic resistance between the magnetic material portion and core portion is much lower than those in the air gap portion and permanent magnet portion, each permanent magnet is assigned the magnetic resistance between one air gap and one permanent magnet in the related art. On the other hand, in this embodiment, each permanent magnet is assigned the magnetic resistance between two air gaps and one permanent magnet. Since, however, the thickness of the air gap is much smaller than that of the permanent magnet, the amount of one permanent magnet can be almost equal to that of the related art. Consequently, the use amount of permanent magnets can be reduced as the number of permanent magnets decreases.

Second Embodiment

Figure 6:
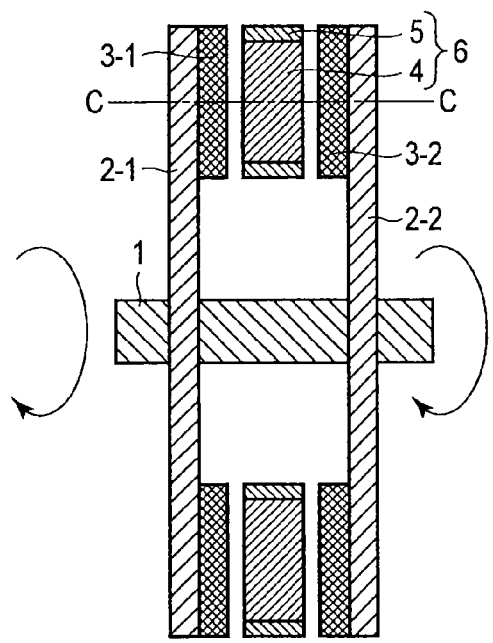
FIG. 6 is an axial-direction sectional view of an axial gap type permanent magnet electric rotating apparatus according to the second embodiment.
Figure 7:
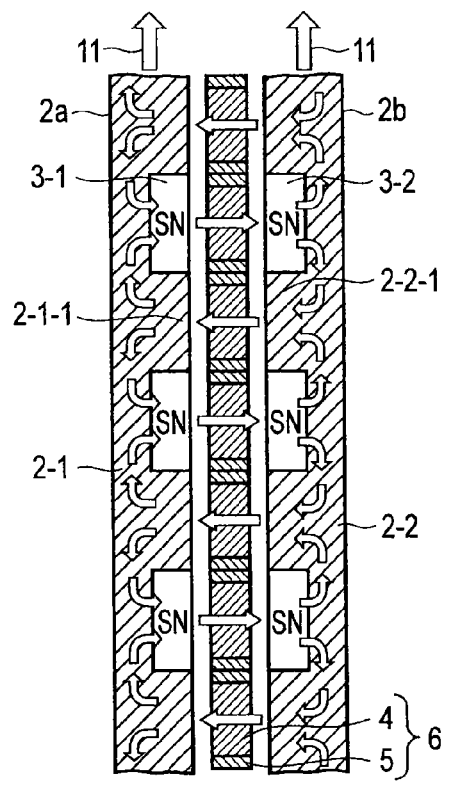
FIG. 7 is a circumferential-direction developed view from a position C-C of FIG. 6.

The arrangement of the second embodiment will be explained below with reference to FIGS. 6 and 7. FIG. 6 is an axial-direction sectional view of an axial gap type permanent magnet electric rotating apparatus according to the second embodiment. FIG. 7 is a circumferential-direction developed view from a position C-C of FIG. 6. The same reference numerals as in FIGS. 1, 2, 3, and 4 of the first embodiment denote the same elements having the same functions in FIGS. 6 and 7, a detailed explanation thereof will be omitted, and portions having different arrangements and different functions will be explained.

In the second embodiment, as shown in FIGS. 6 and 7, first and second rotors 2-1 and 2-2 are attached to a shaft 1 so that relative positions along the circumferential direction of the opposing surfaces of the first and second rotors 2-1 and 2-2 are positions where permanent magnets 3-1 of the first rotor 2-1 and permanent magnets 3-2 of the second rotor 2-2 oppose each other.

Also, on the opposing surfaces of the first and second rotors 2-1 and 2-2, the permanent magnets 3-1 are adhered on the surface of the first rotor 2-1, which opposes the second rotor 2-2, such that the polarities of the permanent magnets 3-1 of the first rotor 2-1 and those of the permanent magnets 3-2 of the second rotor 2-2 are different from each other. Furthermore, the second permanent magnets 3-2 are adhered on the surface of the second rotor 2-2, which opposes the first rotor 2-1.

In the second embodiment as shown in FIG. 7, the polarity of all those surfaces of the permanent magnets 3-1 of the first rotor 2-1, which oppose the second rotor 2, is the N pole. The polarity of all those surfaces of the permanent magnets 3-2 of the second rotor 2-2, which oppose the first rotor 2-1, is the S pole. The configuration is otherwise the same as that of the first embodiment, so a detailed explanation thereof will be omitted.

Figure 8:
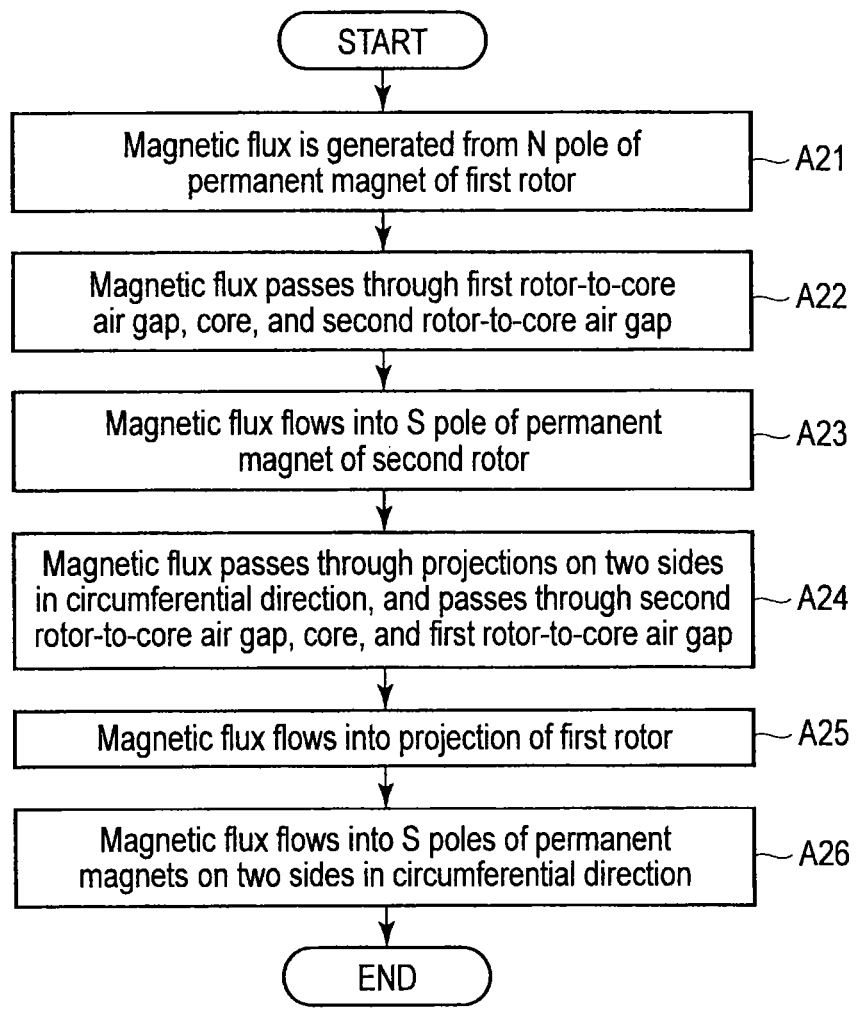
FIG. 8 is a flowchart for explaining the flow of a magnetic flux in the axial gap type permanent magnet electric rotating apparatus according to the second embodiment.

The function of the second embodiment will now be explained. FIG. 8 is a flowchart for explaining the flow of a magnetic flux in the axial gap type permanent magnet electric rotating apparatus according to the second embodiment.

When a magnetic flux is generated from the N pole of the permanent magnet 3-1 of the first rotor 2-1 (step A21), this magnetic flux passes through the air gap between the first rotor 2-1 and an armature core 4 along the axial direction, and passes through the armature core 4. This magnetic flux further passes through the air gap between the armature core 4 and second rotor 2-2 along the axial direction (step A22), and flows into the S pole of the permanent magnet 3-2 of the second rotor 2-2 (step A23).

This magnetic flux flowing out from the N pole of the permanent magnet 3-2 passes through projections 2-2-1 on the two sides of the permanent magnet 3-2 in the circumferential direction, passes through the air gap between the second rotor 2-2 and armature core 4 along the axial direction, and passes through the armature core 4. This magnetic flux further passes through the air gap between the armature core 4 and first rotor 2-1 (step A24). This magnetic flux flows into a projection 2-1-1 of the first rotor 2-1 (step A25). This magnetic flux flows into the S poles of the permanent magnets 3-1 on the two sides of the projection 2-1-1 in the circumferential direction (step A26), and flows in the form of a loop between the first and second rotors 2-1 and 2-2.

As in the first embodiment, the first and second rotors 2-1 and 2-2 are attached to the shaft 1 while maintaining their relative positions. When the shaft 1 rotates, the first and second rotors 2-1 and 2-2 also rotate while their relative positions are maintained, so a rotating magnetic field acts on the armature core 4. An armature coil 5 is wound around the axial-direction circumferential surface of each armature core 4, and the armature coil 5 is so connected as to form three phases in a stator 7. Therefore, the axial gap type permanent magnet electric rotating apparatus can generate induced electric power, and functions as a generator.

In the second embodiment as explained above, the projections 2-1-1 and permanent magnets 3-1 are alternately arranged along the circumferential direction in the first rotor 2-1, and the projections 2-2-1 and permanent magnets 3-2 are alternately arranged along the circumferential direction in the second rotor 2-2, as in the first embodiment. In addition, the projections 2-1-1 and 2-2-1 of the two rotors also form magnetic poles. When configuring a twelve-pole axial gap type permanent magnet electric rotating apparatus, therefore, a magnetic path can be formed by setting the number of permanent magnets of each rotor to six, which is half that of the related art.

Accordingly, the total number of magnets can be reduced to 12, which is half of 24 of the related art. This makes it possible to reduce the use amount of expensive permanent magnets. In addition, since the number of assembling parts decreases, assembling is simplified, and the assembling cost can be reduced.

Assuming that the magnetic resistance between the magnetic material portion and core portion is much lower than those in the air gap portion and permanent magnet portion, each permanent magnet is assigned the magnetic resistance of one air gap and that of one permanent magnet in the related art. On the other hand, in the second embodiment, each permanent magnet is assigned the magnetic resistance of two air gaps and that of one permanent magnet as in the first embodiment. Since, however, the thickness of the air gap is much smaller than that of the permanent magnet, the use amount of one permanent magnet is almost equal to that of the related art. Consequently, the use amount of permanent magnets can be reduced as the number of permanent magnets decreases.

Third Embodiment

Figure 9:
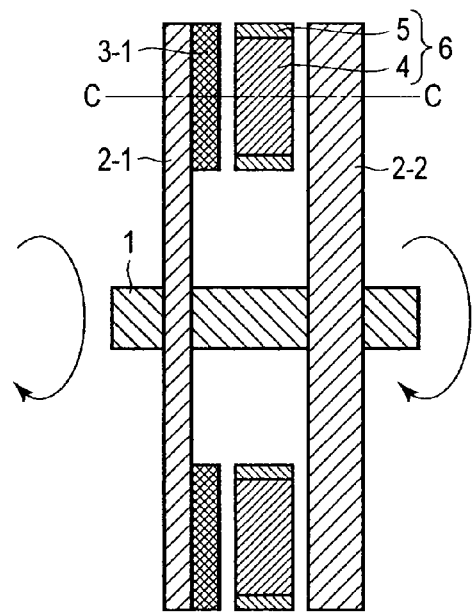
FIG. 9 is an axial-direction sectional view of an axial gap type permanent magnet electric rotating apparatus according to the third embodiment.
Figure 10:
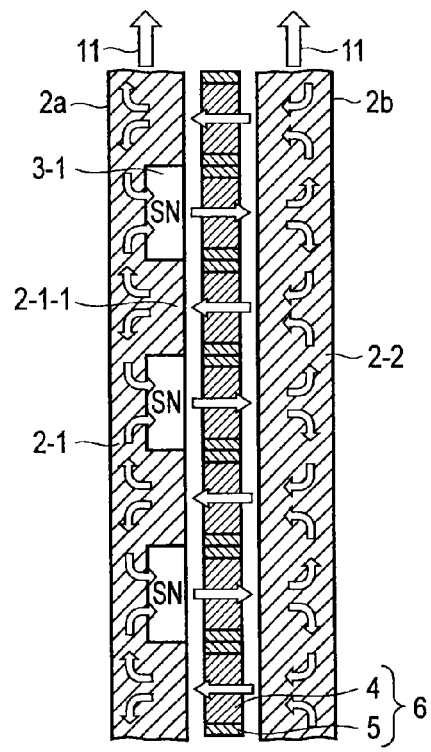
FIG. 10 is a circumferential-direction developed view from a position C-C of FIG. 9.

The third embodiment will be explained below with reference to FIGS. 9 and 10. FIG. 9 is an axial-direction sectional view of an axial gap type permanent magnet electric rotating apparatus according to the third embodiment. FIG. 10 is a circumferential-direction developed view from a position C-C of FIG. 9. The same reference numerals as in FIGS. 1, 2, 3, and 4 of the first embodiment denote the same elements having the same functions in FIGS. 9 and 10, a detailed explanation thereof will be omitted, and portions having different arrangements and different functions will be explained.

In the third embodiment as shown in FIGS. 9 and 10, a first rotor 2-1 is configured in the same manner as in the first and second embodiments. A second rotor 2-2 includes a rotating disk 2b having a surface perpendicular to the rotation center of a shaft 1 and containing a magnetic material, and is fixed to the shaft 1.

As in the first and second embodiments, a stator 7 including armatures 6 is arranged between the first and second rotors 2-1 and 2-2. The configuration is otherwise the same as that of the first and second embodiments.

Figure 11:
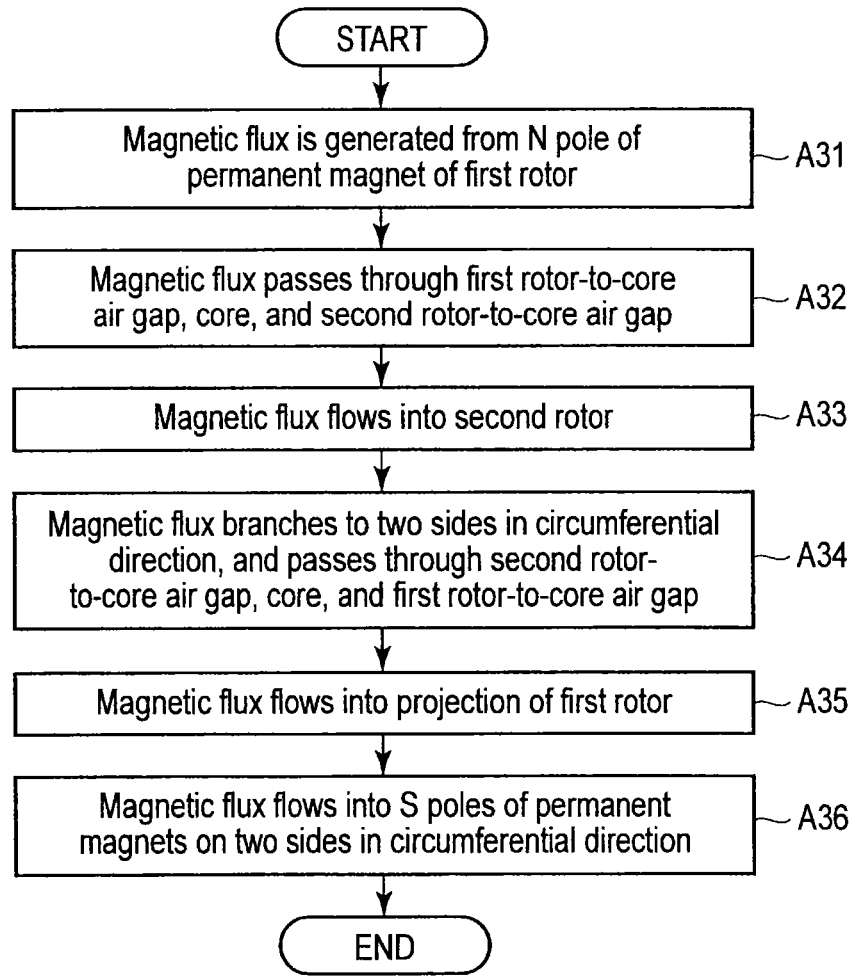
FIG. 11 is a flowchart for explaining the flow of a magnetic flux in the axial gap type permanent magnet electric rotating apparatus according to the third embodiment.

The function of the third embodiment will now be explained. FIG. 11 is a flowchart for explaining the flow of a magnetic flux in the axial gap type permanent magnet electric rotating apparatus according to the third embodiment.

When a magnetic flux is generated from the N pole of a permanent magnet 3-1 of the first rotor 2-1 (step A31), this magnetic flux passes through the air gap between the first rotor 2-1 and an armature core 4 along the axial direction, and passes through the armature core 4. This magnetic flux further passes through the air gap between the armature core 4 and second rotor 2-2 (step A32), and flows into the second rotor 2-2 (step A33).

The magnetic flux having flowed into the second rotor 2-2 branches to the two sides in the circumferential direction, the two magnetic fluxes pass through the air gaps between the second rotor 2-2 and armature cores 4 from surfaces positioned on the two sides of the armature core 4 in the circumferential direction, and each magnetic flux passes through the armature core 4. This magnetic flux further passes through the air gap between the armature core 4 and first rotor 2-1 (step A34). This magnetic flux flows into a projection 2-1-1 of the first rotor 2-1 (step A35). The magnetic flux having flowed into the projection 2-1-1 of the first rotor 2-1 branches along the circumferential direction, and the two magnetic fluxes flow into the S poles of the permanent magnets 3-1 on the two sides of the projection 2-1-1 in the circumferential direction (step A36).

Accordingly, a magnetic loop is formed between the first and second rotors 2-1 and 2-2, and the first and second rotors 2-1 and 2-2 are rotated by the shaft 1. Consequently, a magnetic flux passing through the armature 6 arranged between the first and second rotors 2-1 and 2-2 along the axial direction becomes a rotating magnetic field. Each of the armature coils 5 of the armatures 6 is connected to form three phases, thereby forming the stator 7. Therefore, the axial gap type permanent magnet electric rotating apparatus functions as a generator by the induced electric power of the armature coil 5.

In the third embodiment, no permanent magnet need be used in the second rotor 2-2. When configuring a twelve-pole electric rotating apparatus, therefore, only six permanent magnets are used in the first rotor 2-1. This makes it possible to largely reduce the number of magnets compared to the second embodiment.

In the third embodiment, the magnetic resistance of the air gap in the magnetic resistance assignment per permanent magnet occurs in four portions, which are twice that in the first and second embodiments. Since, however, the magnet is much larger than the air gap, the amount of magnets to be used does not largely increase.

In the third embodiment, the number of permanent magnets can be reduced to ¼ that of the related art. Also, the use amount of one permanent magnet increases as the magnetic resistance of the air gap increases, but can be made less than twice that of the related art. This can make the total use amount of magnets less than ½ that of the related art.

Accordingly, the parts cost can be reduced by an amount equal to the decrease in amount of magnets used. In addition, since the number of parts decreases, assembling is simplified, and the number of assembling steps can be reduced, so the assembling cost can be reduced as well. As a consequence, the manufacturing cost of the axial gap type permanent magnet electric rotating apparatus is very low.

Fourth Embodiment

The fourth embodiment will be explained below with reference to FIGS. 12 and 13. FIG. 12 is an axial-direction sectional view of an axial gap type permanent magnet electric rotating apparatus according to the fourth embodiment. FIG. 13 is a circumferential-direction developed view in a position C-C of FIG. 12. The same reference numerals as in FIGS. 1, 2, 3, and 4 of the first embodiment denote the same elements having the same functions in FIGS. 12 and 13, a detailed explanation thereof will be omitted, and portions having different arrangements and different functions will be explained.

As shown in FIGS. 12 and 13, a first rotor 2-1 includes a rotating disk 2a having a surface perpendicular to the rotation center of a shaft 1 and containing a magnetic material, and is fixed to the shaft 1.

Also, permanent magnets 3 are adhered to positions near the outer circumference of a rotor 2, and magnetic material blocks 2-3 made of a magnetic material and having almost the same shape as that of the permanent magnet 3 are attached between the permanent magnets 3. The configuration is otherwise the same as that of the first embodiment.

Referring to FIG. 13, the first rotor 2-1 and a second rotor 2-2 are configured by arranging the magnetic material blocks 2-3 in portions corresponding to projections 2-1-1 of the first rotor 2-1 and projections 2-2-1 of the second rotor 2-2. The magnetic material blocks 2-3 are made of a magnetic material and have almost the same shape as that of permanent magnets 3-1 and 3-2.

Consequently, in the first rotor 2-1 as shown in FIG. 13, the permanent magnet 3-1, magnetic material block 2-3, permanent magnet 3-1, magnetic material block 2-3, . . . , are arranged in this order on the axial-direction surface. In the second rotor 2-2 as shown in FIG. 13, the permanent magnet 3-2, magnetic material block 2-3, permanent magnet 3-2, magnetic material block 2-3, ..., are arranged in this order on the axial-direction surface. Accordingly, the basic function is the same as that of the first embodiment.

Figure 14:
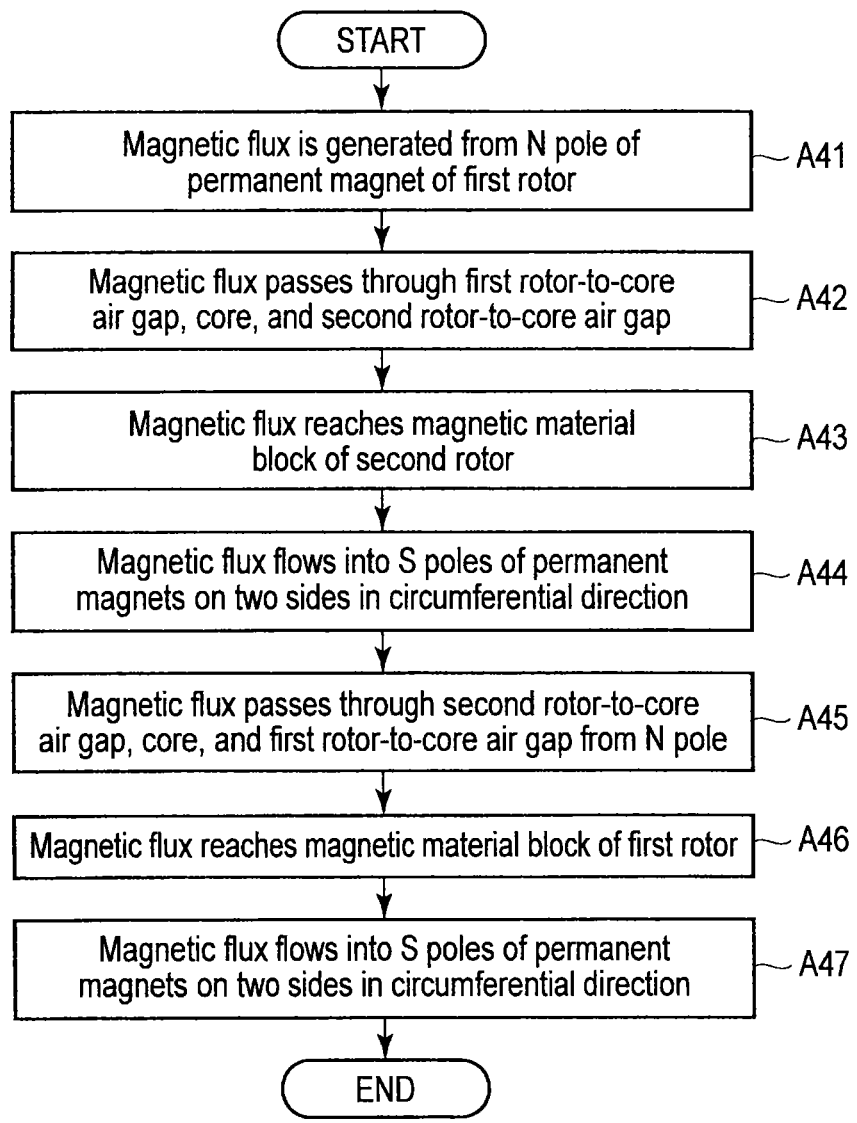
FIG. 14 is a flowchart for explaining the flow of a magnetic flux in the axial gap type permanent magnet electric rotating apparatus according to the fourth embodiment.

The function of the fourth embodiment will now be explained. FIG. 14 is a flowchart for explaining the flow of a magnetic flux in the axial gap type permanent magnet electric rotating apparatus according to the fourth embodiment.

As indicated by arrows in FIG. 13, when a magnetic flux is generated from the N pole of the permanent magnet 3-1 attached to the first rotor 2-1 (step A41), this magnetic flux passes through the air gap between the first rotor 2-1 and an armature core 4 along the axial direction, and passes through the armature core 4. This magnetic flux further passes through the air gap between the armature core 4 and second rotor 2-2 along the axial direction, and reaches the second rotor 2-2 (step A42).

The first and second rotors 2-1 and 2-2 are arranged such that the permanent magnets 3 do not oppose each other in positions along the circumferential direction. Accordingly, the magnetic flux generated from the N pole of the permanent magnet 3-1 of the first rotor 2-1 reaches the magnetic material block 2-3 between two permanent magnets 3-2 of the second rotor 2-2 (step A43).

The magnetic flux having reached the magnetic material block 2-3 of the second rotor 2-2 flows into the S poles of the permanent magnets 3-2 on the two sides of the magnetic material block 2-3 in the circumferential direction (step A44).

This magnetic flux flows out from the N pole of the permanent magnet 3-2 of the second rotor 2-2, further passes through the axial-direction air gap between an armature core 4 and the second rotor 2-2, and passes through the armature core 4. This magnetic flux passes through the axial-direction air gap between the first rotor 2-1 and armature core 4, and reaches the first rotor 2-1 (step A45).

As described above, the first and second rotors 2-1 and 2-2 are arranged such that the permanent magnets 3 are shifted from each other in the circumferential direction in positions along the circumferential direction so as not to oppose each other. Accordingly, the magnetic flux generated from the permanent magnet 3-2 of the second rotor 2-2 reaches the magnetic material block 2-3 between two permanent magnets 3-1 of the first rotor 2-1 (step A46). The magnetic flux having flowed into the magnetic material block 2-3 of the first rotor 2-1 flows into the S poles of the permanent magnets 3-1 on the two sides of the magnetic material block 2-3 in the circumferential direction (step A47).

As explained above, between the first and second rotors 2-1 and 2-2, a magnetic flux flows along the axial direction while making a loop, and always passes through the armature core 4.

The fourth embodiment achieves the same effects as explained in the first embodiment. In addition, as another effect, it is unnecessary to form grooves for attaching the permanent magnets 3-1 or 3-2, or grooves for forming the projections 2-1-1 or 2-2-1 explained in the first embodiment, in the first and second rotors 2-1 and 2-2. This makes it possible to reduce the number of processing steps compared to the first embodiment.

Note that the fourth embodiment can be implemented by only replacing the projections 2-1-1 or 2-2-1 with the magnetic material blocks 2-3 in one or both of the first and second rotors 2-1 and 2-2 explained in the first embodiment. Accordingly, it is, of course, possible to apply the fourth embodiment to the second and third embodiments and achieve the same effects.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An axial gap type permanent magnet electric rotating apparatus comprising a first rotating disk and a second rotating disk having surfaces perpendicular to a rotation center of a shaft and containing a magnetic material, a first rotor to be rotated by a shaft and attached, along a circumferential direction, a plurality of permanent magnets whose magnetic-pole direction is an axial direction on an axial-direction surface of the first rotating disk, a second rotor to be rotated by the shaft and attached, along the circumferential direction, a plurality of permanent magnets whose magnetic-pole direction is the axial direction on an axial-direction surface of the second rotating disk, such that axial-direction surfaces of the permanent magnets oppose axial-direction surfaces of the permanent magnets of the first rotor, and an armature arranged between axial-direction opposing surfaces of the first rotor and the second rotor, wherein
the magnetic-pole directions of all the permanent magnets attached to the surface of the first rotor, which opposes the second rotor, are the same;
the magnetic-pole directions of all the permanent magnets attached to the surface of the second rotor, which opposes the first rotor, are the same;
a portion between two permanent magnets along the circumferential direction of each rotor is made of a magnetic material having substantially the same size as that of the permanent magnet such that axial-direction surfaces are the same between the permanent magnets on two sides in the circumferential direction; and
between the first rotor and the second rotor, a magnetic flux flows along the axial direction while making a loop and passes through the armature.

2. The apparatus according to claim 1, wherein the permanent magnets of the first rotor and the permanent magnets of the second rotor are shifted along the circumferential direction such that the permanent magnets do not oppose each other.

3. The apparatus according to claim 1, wherein
the permanent magnets of the first rotor and the permanent magnets of the second rotor oppose each other in positions along the circumferential direction; and
the magnetic-pole direction of the permanent magnets of the first rotor and the magnetic-pole direction of the permanent magnets of the second rotor are different from each other on the axial-direction opposing surfaces.

4. The apparatus according to claim 1, wherein
the permanent magnets are attached to only the first rotor; and
the second rotor is configured by the rotating disk which is made of a magnetic material and to which no permanent magnet is attached.

5. The apparatus according to claim 1, wherein a groove is formed in the rotor such that the axial-direction surface is flat when the permanent magnets are attached, and the permanent magnets are attached to the groove.

6. The apparatus according to claim 2, wherein a groove is formed in the rotor such that the axial-direction surface is flat when the permanent magnets are attached, and the permanent magnets are attached to the groove.

7. The apparatus according to claim 3, wherein a groove is formed in the rotor such that the axial-direction surface is flat when the permanent magnets are attached, and the permanent magnets are attached to the groove.

8. The apparatus according to claim 1, further comprising a magnetic material having substantially the same size as that of the permanent magnet such that the axial-direction surface is flat between the permanent magnets on two sides of the magnetic material in the circumferential direction, wherein the magnetic material comprises a projection of the first rotating disk and a projection of the second rotating disk.

9. The apparatus according to claim 2, further comprising a magnetic material having substantially the same size as that of the permanent magnet such that the axial-direction surface is flat between the permanent magnets on two sides of the magnetic material in the circumferential direction, wherein the magnetic material comprises a projection of the first rotating disk and a projection of the second rotating disk.

10. The apparatus according to claim 3, further comprising a magnetic material having substantially the same size as that of the permanent magnet such that the axial-direction surface is flat between the permanent magnets on two sides of the magnetic material in the circumferential direction, wherein the magnetic material comprises a projection of the first rotating disk and a projection of the second rotating disk.

11. A manufacturing method to be applied to an axial gap type permanent magnet electric rotating apparatus including a first rotating disk and a second rotating disk having surfaces perpendicular to a rotation center of a shaft and containing a magnetic material, a first rotor to be rotated by a shaft and attached, along a circumferential direction, a plurality of permanent magnets whose magnetic-pole direction is an axial direction on an axial-direction surface of the first rotating disk, a second rotor to be rotated by the shaft and attached, along the circumferential direction, a plurality of permanent magnets whose magnetic-pole direction is the axial direction on an axial-direction surface of the second rotating disk, such that axial-direction surfaces of the permanent magnets oppose axial-direction surfaces of the permanent magnets of the first rotor, and an armature arranged between axial-direction opposing surfaces of the first rotor and the second rotor, the manufacturing method comprising:

arranging the permanent magnets such that the magnetic-pole directions of all the permanent magnets attached to the surface of the first rotor, which opposes the second rotor, are the same;

arranging the permanent magnets such that the magnetic-pole directions of all the permanent magnets attached to the surface of the second rotor, which opposes the first rotor, are the same; and configuring a portion between two permanent magnets along the circumferential direction of each rotor with a magnetic material having substantially the same size as those of the permanent magnets such that axial-direction surfaces are the same between the permanent magnets on two sides in the circumferential direction, wherein between the first rotor and the second rotor, a magnetic flux flows along the axial direction while making a loop and passes through the armature.

* * * * *